Oct. 20, 1953 L. C. CLAIR 2,655,934
SAFETY SHUTOFF DEVICE FOR OIL AND GAS WELLS
Filed Dec. 14, 1949 3 Sheets-Sheet 2
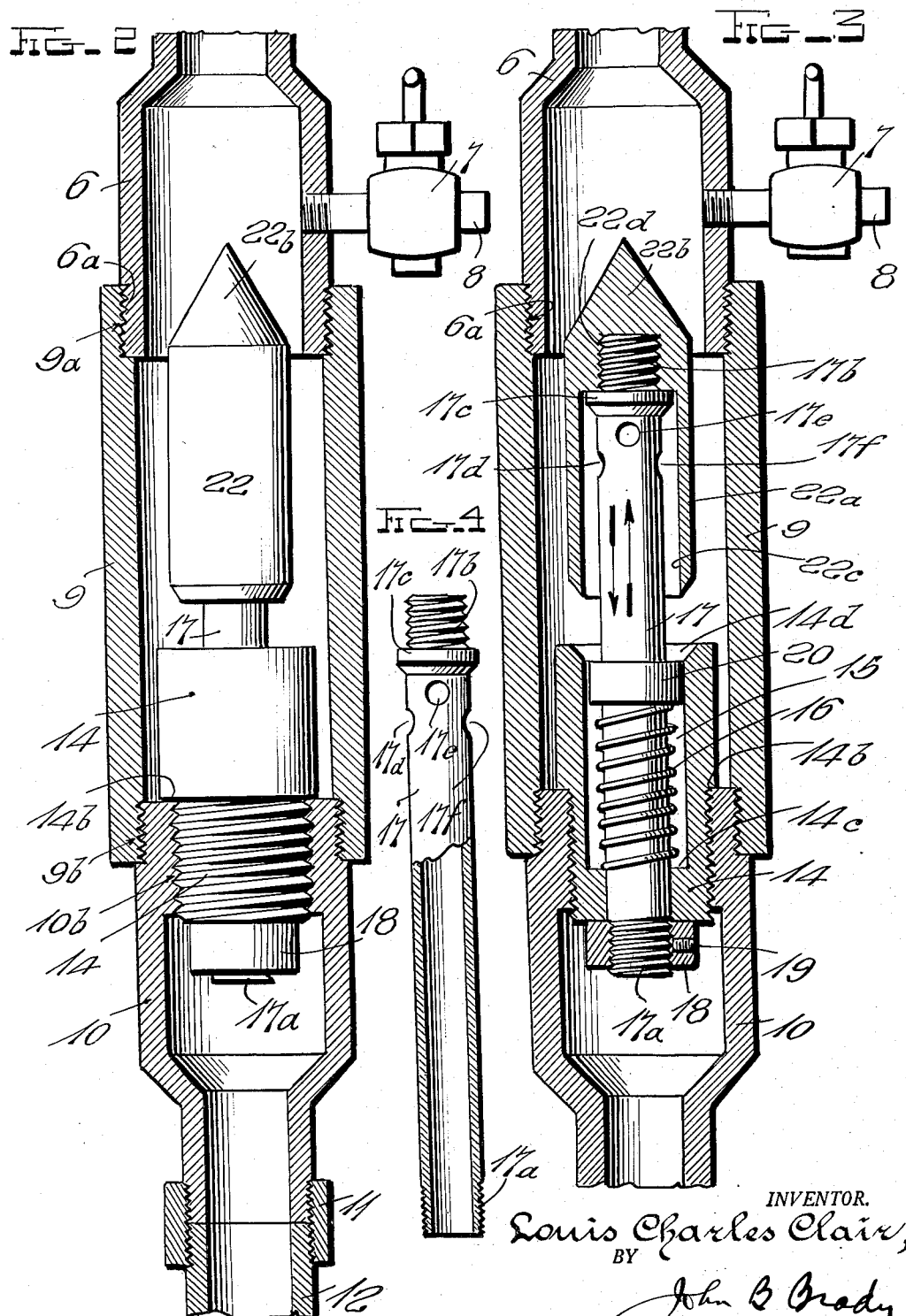
INVENTOR.
Louis Charles Clair,
BY
John B Brady
ATTORNEY Oct. 20, 1953    L. C. CLAIR    2,655,934
SAFETY SHUTOFF DEVICE FOR OIL AND GAS WELLS
Filed Dec. 14, 1949    3 Sheets-Sheet 3
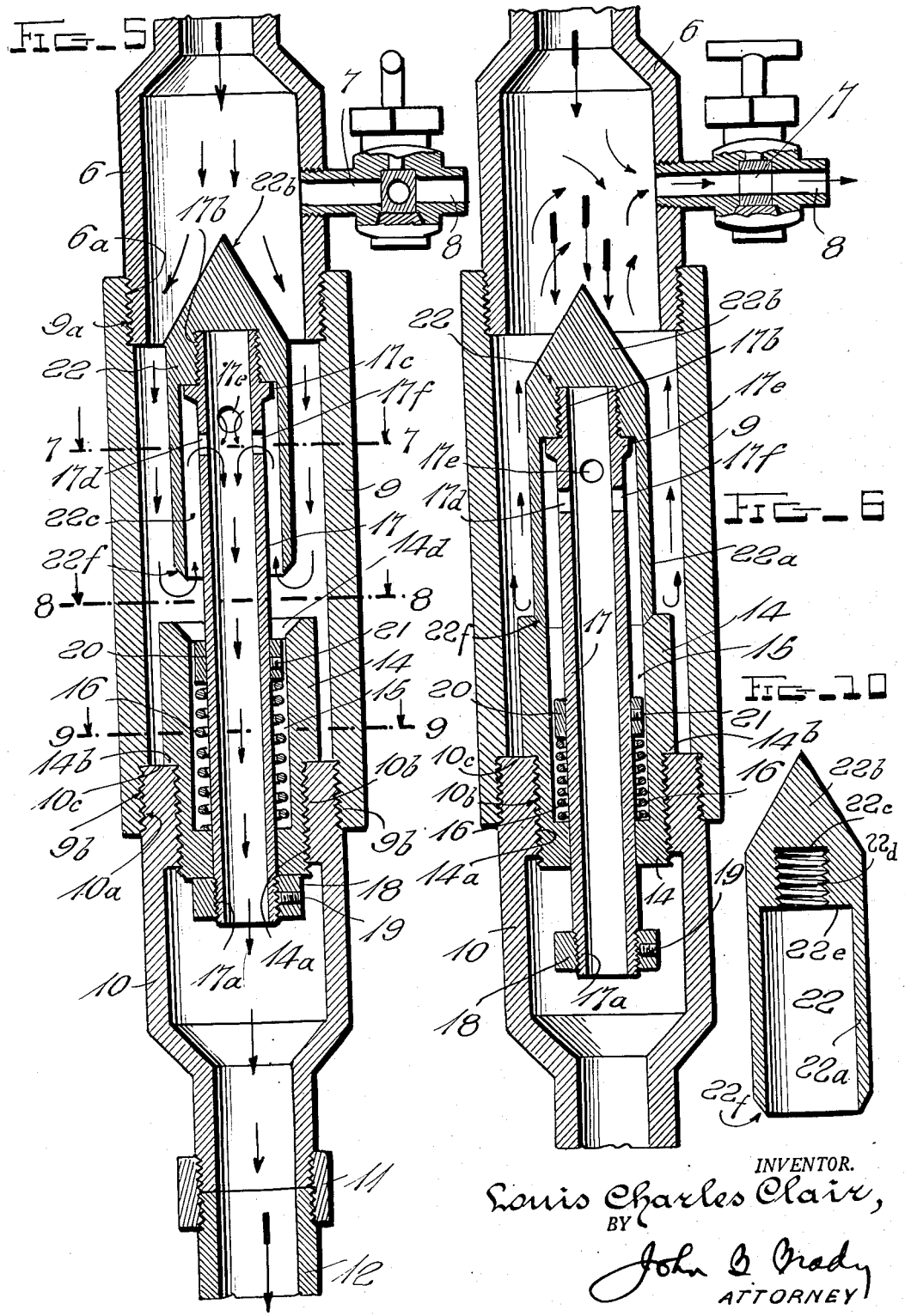
INVENTOR.
Louis Charles Clair,
BY
John B. Brady
ATTORNEY Patented Oct. 20, 1953

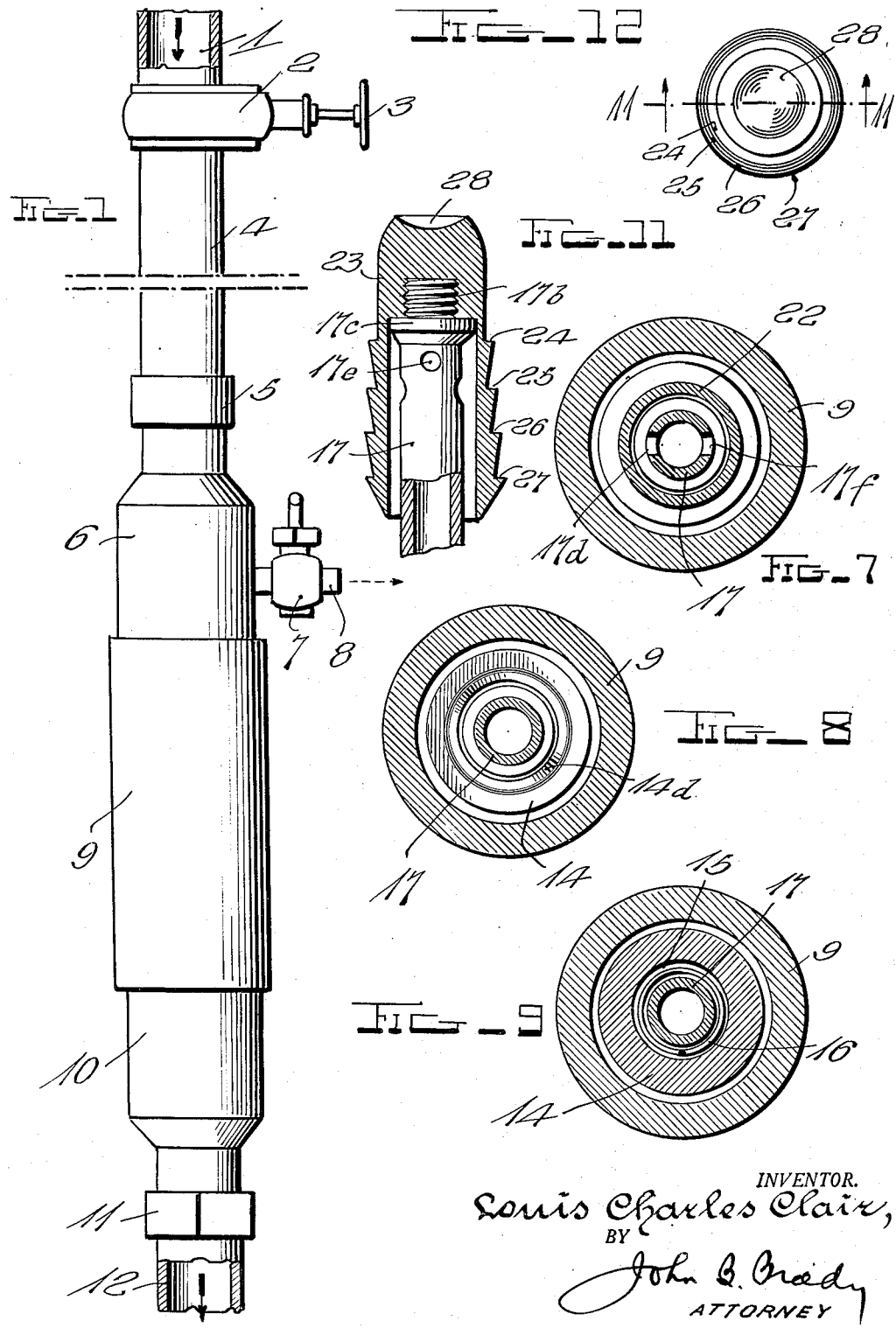

2,655,934

UNITED STATES PATENT OFFICE 2,655,934

SAFETY SHUTOFF DEVICE FOR OIL AND GAS WELLS

Louis Charles Clair, Bernice, La., assignor of one-eighth to Merrick Semion Whitfield, Homer, one-sixteenth to Will Ellis Worley, Shreveport, La., one-eighth to Rufus F. Peterson, Palestine, Tex., and one-eighth to Jesse Delton Dyal, Lisbon, La.

Application December 14, 1949, Serial No. 132,860

9 Claims. (Cl. 137—498)

My invention relates broadly to oil and gas well equipment, and more particularly to a safety shut off valve for use in oil and gas well installations for eliminating loss of oil and gas under high pressure conditions incident to gushing.

One of the objects of my invention is to provide a simplified construction of safety shut off valve for oil and gas well installation wherein, under conditions of normal oil and gas flow the valve is maintained in position for establishing a discharge path for the passage of oil and gas, whereas under sudden conditions of increases in pressure which would normally result in wastage of the oil and gas, the valve operates to automatically shut off the discharge.

Still another object of my invention is to provide a construction of safety shut off valve for oil and gas installations in which an adjustable spring controlled valve is interposed within a housing intermediate intake and discharge connections and set for normally establishing a fluid flow path for oil and gas between the said connections, while being yieldably responsive to sudden increases in oil and/or gas pressure for cutting off the discharge path through the valve.

Still another object of my invention is to provide a simplified construction of resiliently adjustable valve for oil and gas well installations, including a pressure responsive member normally subject to the pressure flow of oil and/or gas in a state of balanced equilibrium for maintaining a discharge path through the valve, but displaceable under conditions of abnormal increase in oil and/or gas pressure for shutting off the discharge path through the valve.

A still further object of my invention is to provide an improved construction of safety shut off reciprocating valve for installation in pipe lines in which a reciprocatory member having a head thereon is directly subject to the flow of oil and/or gas and displacement thereof resisted by adjustable spring means for all normal operating pressures, but in which the head may be displaced against the action of the spring means under conditions of increase under oil and/or gas pressures beyond a predetermined pressure for shutting off the flow of oil and/or gas through the valve.

Still another object of my invention is to provide a construction of spring balanced valve for installation concentrically within a pipe line, including a head disposed axially in the flow path of the oil and/or gas, where the area of the head is selected with respect to the pressure flow of the oil and/or gas, whereby a displacement of the head is effected under conditions of excessive increase in pressure for cutting off the discharge path through the valve.

Still another object of my invention is to provide a construction of displaceable head for an oil and/or gas discharge valve in which the head is provided with a multiplicity of successively enlarging annular impact faces thereon, forming obstructions with respect to the onrushing oil and/or gas, whereby a displacement of the head is effected under conditions of abnormal increase in oil and/or gas pressure for moving the head to effect a valve shut off under conditions of excessive pressure.

Still another object of my invention is to provide a construction of spring controlled safety shut off valve for oil and gas well installations constructed of a minimum number of parts and assembled in inexpensive and compact manner for protecting oil well installations against losses incident to the bringing in of a gusher, or under conditions of the sudden development of abnormal pressure in the well, as set forth more fully in the specification hereinafter following by reference to the accompanying drawings, in which:

Figure 1 is a side elevational view of an assembled safety valve constructed in accordance with my invention and interposed between the oil and gas discharge pipe or christmas tree of an oil well installation for protecting the well against losses of oil and gas, the oil and gas discharge pipe and the outlet pipe being broken away and illustrated in section; Fig. 2 is a vertical sectional view taken through the safety shut off valve of my invention, with certain of the parts illustrated in elevation; Fig. 3 is a view similar to the view shown in Fig. 2, with the valve mounting means, valve seat and valve actuator illustrated in vertical section; Fig. 4 is a detail view of the valve mounting means showing the tubular construction thereof and the screw-threaded end for attachment of the head thereto, and illustrating particularly the staggered apertures in the sides of the tubular structure; Fig. 5 is a vertical sectional view through the valve of my invention, with the flow path for the oil and/or gas through the valve indicated by arrows, and showing the manner in which the spring means operates to maintain the valve head in open position for permitting continuous flow of oil and/or gas therethrough; Fig. 6 is a vertical sectional view through the valve, similar to the view shown in Fig. 5, but illustrating the displaced position of the valve for shutting off the flow path therethrough under conditions of excessive rise in pressure; Fig. 7 is a transverse sectional view taken substantially on line 7—7 of Fig. 5; Fig. 8 is a transverse sectional view taken substantially on line 8—8 of Fig. 5; Fig. 9 is a cross-sectional view taken substantially on line 9—9 of Fig. 5; Fig. 10 is a vertical sectional view through the form of head illustrated in the assembly of the safety shut off valve shown in Figs. 2-9; Fig. 11 is a vertical sectional view through a modified form of valve head employing a multiplicity of successively enlarged annular flanges thereon, against which the impact of the flow of oil and/or gas is effective for more readily displacing the valve head in closing the valve under conditions of increase of the pressure of the oil and/or gas flow; and Fig. 12 is a top plan view of the modified form of head shown in Fig. 11.

My invention is directed to the construction of a safety shut off valve for oil and gas well installations, wherein losses of oil and gas, under conditions of excessive discharge pressure, may be prevented. I provide a safety shut off valve which may be mounted in axial alignment with the interior of an oil and gas line leading from a Christmas tree or directly from the well. The shut off valve is mounted within a housing symmetrically arranged at opposite ends and wherein the housing supports a member on which all parts of the safety shut off valve are mounted. The member includes an annular supporting member forming a coil spring guide, and through which a reciprocatory slidable tubular member extends. The reciprocatory slidable tubular member is provided with an adjustable collar thereon which is selectively adjustable to form an annular seat for a coil spring within which the reciprocatory slidable tubular member operates. An adjustable stop on the reciprocatory slidable tubular member limits the effective stroke of the tubular member and the coaction of a hand carried by the said tubular member with a valve seat on the member that supports the entire valve assembly. The head is provided with an extended cylindrical skirt which surrounds the reciprocatory slidable tubular member, and forms a guide for the onrushing oil and/or gas which is directed through openings in the reciprocatory slidable tubular member for discharge through the said tubular member. The head is of very special construction, and is provided with an external surface area in excess of the surface area interior of the head for providing a condition of unstable equilibrium with respect to the pressure of the onrushing oil and/or gas, so that the head becomes sensitive for displacement under conditions of substantial change in oil and/or gas pressure for displacing the reciprocatory slidable tubular member to a position in which the head abuts against the supporting member support, thereby closing the passage between the oil and gas discharge pipe and the outlet pipe, preventing losses of oil and gas. A valve is provided in the housing for relieving the housing of any dangerously high pressure conditions.

Referring to the drawings in detail, reference character 1 designates an oil and gas discharge pipe which may lead from a Christmas tree or directly from a well. Pipe 1 connects to a gate valve housing 2 in which a gate valve 3 is mounted. The gate valve housing 2 connects to pipe 4 leading to the valve housing of my invention. A coupling 5 connects the pipe 4 to the enlarging coupling 6 forming part of the valve housing. The enlarging coupling 6 provides a connection for the valve 7 having a discharge pipe 8 extending therefrom. The end of the enlarging coupling 6 is provided with external screw-threads 6a thereon, which engage internal screw threads 9a in the end of the cylindrical housing 9. The other end of the cylindrical housing 9 is provided with internal screw threads 9b for receiving the external threads 10a on the reducing coupling 10 forming part of the valve housing. The reducing coupling 10 is externally screw-threaded on the end thereof for receiving coupling 11, which in turn connects with the outlet pipe 12.

The interior of the reducing coupling 10 is internally screw-threaded over a substantial portion of the interior thereof, as represented at 10b, for receiving the screw-threaded member 14 which forms the assembly for mounting the safety shut off valve of my invention. The member 14 is cylindrical and extends concentrically in one direction within the cylindrical housing 9, and is spaced from the interior walls thereof and extends in the other direction into the reducing 10, and is externally screw-threaded at 14a to engage the interior screw threads 10b of the reducing coupling 10. The member 14 has an annular shoulder 14b thereon which abuts against the end face 10c of the reducing coupling 10. The member 14 has an annular recess 15 extending interiorly thereof, terminating in the annular seat 14c at the interior end extremity thereof and terminating in an annular valve seat 14d at the exterior end thereof. A coil spring 16 is housed within the annular recess 15, and is of such size as will allow the reciprocatory slidable tubular member 17 to extend freely therethrough.

The reciprocatory slidable tubular member 17 extends axially of the cartridge 14 and cylindrical housing 9, and is screw-threaded on the extremity at 17a thereof which passes through and beyond the member 14. The screw threads 17a are adjustably engaged by internal screw-threaded collar 18, which may be selectively set in an adjusted position by set screw 19.

Another adjustable collar 20 is provided on the reciprocatory slidable tubular member 17 in a position within the annular recess 15 of member 14 and is selectively setable in a position displaced from the annular valve seat 14d. The collar 20 is selectively setable on the reciprocatory slidable tubular member 17 by means of set screw 21. The position of collar 20 is set before the reciprocatory slidable tubular member 17 is introduced through the end of the member 14. Coil spring 16 tends to normally exert a force against collar 20, recessed by abutment of the coil spring with the end of the recess in the member 14, for normally projecting reciprocatory slidable tubular member 17 to a position within the member 14 determined by the abutment of collar 18 with the external end of the member 14.

The opposite end of the reciprocatory slidable tubular member 17 is also screw-threaded, as represented at 17b, and is provided with an annular flange 17c displaced from the end thereof. Staggered apertures 17d, 17e and 17f are provided in the reciprocatory slidable tubular member 17 in a position adjacent but displaced from the annular flange 17c. These apertures 17d, 17e and 17f form passageways for the oil and gas in the course of the movement thereof from the discharge pipe 1 of the outlet pipe 12.

The valve head which forms an important feature of my invention is shown at 22, and occupies a position concentrically within the cylindrical housing 9, and extending into the enlarging coupling 10. The valve head is shown more particularly in Fig. 10, and includes a cylindrical shell 22a which is relatively thin walled, and a frusto-conical shaped terminus 22b. The in-interior of the frusto-conical shaped terminus 22b is recessed at 22c, and internally screw-threaded, as represented at 22d, for receiving the screw-threaded end 17b of the reciprocatory slidable tubular member 17. The flange 17c of the reciprocatory slidable tubular member 17 forms an abutment against the interior end face 22e of the valve head 22, for establishing a rigid inter-connection between the valve head 22 and the reciprocatory slidable tubular member 17. It will be noted that the thin walled skirt 22a of the valve head 22 forms a protective guide or hood extending over the staggered apertures 17d, 17e and 17f in the reciprocatory slidable tubular member 17, so that the path of the oil and gas follows the direction indicated by the arrows in Fig. 5. The oil and gas strikes the frusto-conical shaped terminus 22b of valve head 22, and flows over the external surface of shell 22a and around the ground valve seat edge 22f, and between the external surface of the reciprocatory slidable tubular member 17 and the interior surface of the shell 22a and through the apertures 17d, 17e and 17f for discharge axially through the hollow center of the reciprocatory slidable tubular member 17 and through the reducing coupling 10 of the outlet pipe 12.

The area of the valve head 22 which is exposed to the onrushing oil and gas is selected of such size that the pressure exerted by the onrushing oil and gas exceeds the compensating pressure which is exerted by the onrushing oil and gas in the annular gap between the exterior surface of the reciprocatory slidable tubular member 17, the interior surface of the shell 22a, and the surface of the flange 17c adjacent the abutment of the valve head 22 with the reciprocatory slidable tubular member 17. Coil spring 16 is normally so tensioned that valve head 22 is projected to the position illustrated in Figs. 2, 3 and 5 for all normal conditions of flow of the oil and gas in the path represented by the arrows in Fig. 5. However, under conditions of increase of pressure incident to gushing and violent discharge, the over-all dynamic pressure on the large external area of the valve head 22 overbalances the tension effects of coil spring 16 and the compensatory effects of the counter-flow normally induced between the interior of the shell 22a and the exterior of the reciprocatory slidable tubular member 17, so that the valve assembly is displaced to the position illustrated in Fig. 6, whereupon the ground valve seat 22f of valve head 22 establishes seating relation with the annular valve seat 14d in member 14, thereby shutting off the flow of oil and gas between the discharge pipe 1 and the outlet pipe 12.

In order to increase the effective area of the head, I may employ a construction as illustrated in Figs. 11 and 12. In this arrangement the head is shaped as shown at 23 to provide a substantially cylindrical upper section and a skirt formed by a multiplicity of successively enlarging sections. This is accomplished by providing annular flanges 24, 25, 26 and 27 on the head 23, as shown in Fig. 11, where these flanges successively increase in diameter as illustrated in Fig. 12. The upper end of the head 23 is recessed as shown at 28, so that the pressure is effective over a large surface area as compared to the smaller surface area interiorly of the head, as explained in connection with Figs. 2–10. Other shapes may be imparted to the head for securing a large effective area against which the sudden pressures of oil and/or gas are exerted.

While I have described my invention in certain of its preferred embodiments, I realize that modifications may be made, and I desire that it be understood that no limitations upon my invention are intended other than may be imposed by the scope of the appended claims.

What I claim as new and desire to secure by Letters Patent of the United States, is as follows:

1. A safety shutoff valve for oil and/or gas comprising a housing internally screw-threaded at each end thereof, coupling means at each end of said housing, one of said coupling means being internally screw-threaded, a screw-threaded member mounted in the internal screw threads in said last mentioned coupling means, said member having an axial bore extending therethrough, a tube slidable through the bore in said member and projecting beyond the end thereof, an abutment carried by said tube beyond the end of said member, an adjustable collar carried by said tube and slidable concentrically within said member, a coil spring seated within said member concentrically around said tube and confined by said adjustable collar on said tube, said spring being biased for normally projecting said tube through said member limited by the abutment on the end thereof, the opposite end of said tube having a screw-threaded terminus thereon and having ports in the side walls thereof and a valve head carried by the screw-threaded end of said tube and having a skirt thereon annularly spaced from said tube and extending over the ports therein and providing an annular pressure flow path intermediate the exterior surface of said tube and the interior surface of said head, said skirt terminating in a peripheral valve seat and a valve seat on said member adapted to coact with the peripheral valve seat on said head when said head is displaced by pressure of oil and/or gas during the passage thereof from one of said coupling means to the other of said coupling means through said tube.

2. A safety shutoff valve for oil and/or gas as set forth in claim 1 in which said head has an external surface area exposed to the incoming pressure of oil and/or gas which is substantially in the shape of the frustum of a cone.

3. A safety shutoff valve for oil and/or gas as set forth in claim 1 in which said abutment is formed by an internally screw-threaded collar engaging external screw threads on the end of said tube, and in which the collar is adjustable along the end of said tube for predetermining the displacement between the peripheral seat on said head and the valve seat on said member.

4. A safety shutoff valve for oil and/or gas as set forth in claim 1 in which said tube is provided with an annular flange adjacent the screw-threaded terminus thereof, forming an internal support for the terminus of said valve head.

5. A safety shutoff valve for oil and/or gas as set forth in claim 1 in which said adjustable collar is maintained on said tube in a position concentric with said member displaced from the valve seat thereon.

6. A safety shutoff valve for oil and/or gas as set forth in claim 1 in which said valve head has an external exposed surface in excess of the internal exposed surface thereof for maintaining a condition of unstable equilibrium under conditions of increase in pressure of oil and/or gas against the external surface of said head, and effecting axial displacement of said tube for cutting off the flow of oil and/or gas between the end surface of said head and said tube and through the interior of said tube to the discharge end of said housing for effecting displacement of said tube and producing a sealing relation between the peripheral seat on said head and the valve seat on said member.

7. A safety shutoff valve for oil and/or gas as set forth in claim 1 in which said valve head is provided with a recess in the end thereof against which oil and/or gas pressure is effective.

8. A safety shutoff valve for oil and/or gas as set forth in claim 1 in which said valve head is provided with a multiplicity of annular sections of increasing diameter spaced progressively along the length of said valve head to the peripheral seat on the end thereof.

9. A safety shutoff valve for oil and/or gas as set forth in claim 1 in which said valve head is provided with a recess in the end thereof and a multiplicity of spaced annular flanges along the length thereof, where said annular flanges increase in diameter progressively from the recessed end of said valve head to the peripheral seat on the opposite end thereof.

LOUIS CHARLES CLAIR.

References Cited in the file of this patent

UNITED STATES PATENTS

| Number | Name | Date |
| --- | --- | --- |
| 13,498 | Russell | Aug. 28, 1855 |
| 36,127 | Stiren | Aug. 5, 1862 |
| 72,793 | Bundy | Dec. 31, 1867 |
| 762,274 | Bourseau | June 4, 1904 |
| 934,286 | Cole | Sept. 14, 1909 |
| 1,933,852 | Hahn | Nov. 7, 1933 |
| 2,285,049 | Parks | June 2, 1942 |
| 2,357,321 | Fuller | Sept. 5, 1944 |
| 2,389,887 | Baxter | Nov. 27, 1945 |
| 2,447,546 | Spencer | Aug. 24, 1948 |

FOREIGN PATENTS

| Number | Country | Date |
| --- | --- | --- |
| 7,098 | Great Britain | of 1899 |
| 8,845 | Great Britain | of 1904 |